US011254030B2

(12) United States Patent
Diekmann et al.

(10) Patent No.: US 11,254,030 B2
(45) Date of Patent: Feb. 22, 2022

(54) POLYMER POWDER HAVING LOW SURFACE ENERGY FOR POWDER BED FUSION METHODS

(71) Applicant: Evonik Operations GmbH, Essen (DE)

(72) Inventors: Wolfgang Diekmann, Waltrop (DE); Maik Grebe, Bochum (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/752,759

(22) Filed: Jan. 27, 2020

(65) Prior Publication Data

US 2020/0156287 A1    May 21, 2020

Related U.S. Application Data

(63) Continuation of application No. 15/379,260, filed on Dec. 14, 2016, now Pat. No. 10,596,728.

(30) Foreign Application Priority Data

Dec. 14, 2015 (EP) ..................... 15199919

(51) Int. Cl.
| | | |
|---|---|---|
| B32B 5/16 | (2006.01) | |
| B29B 9/16 | (2006.01) | |
| B29C 64/153 | (2017.01) | |
| C08J 3/12 | (2006.01) | |
| C08K 5/01 | (2006.01) | |
| C08G 69/26 | (2006.01) | |
| C08G 69/08 | (2006.01) | |
| B33Y 10/00 | (2015.01) | |
| B33Y 70/00 | (2020.01) | |
| B29K 77/00 | (2006.01) | |
| B29K 105/00 | (2006.01) | |

(52) U.S. Cl.
CPC .............. *B29B 9/16* (2013.01); *B29C 64/153* (2017.08); *C08G 69/08* (2013.01); *C08G 69/26* (2013.01); *C08J 3/128* (2013.01); *C08K 5/01* (2013.01); *B29B 2009/163* (2013.01); *B29K 2077/00* (2013.01); *B29K 2105/251* (2013.01); *B29K 2995/0093* (2013.01); *B33Y 10/00* (2014.12); *B33Y 70/00* (2014.12); *C08J 2300/22* (2013.01); *C08J 2377/02* (2013.01); *C08J 2377/06* (2013.01); *C08K 2201/013* (2013.01)

(58) Field of Classification Search
CPC .......... B33Y 70/00; B33Y 70/10; C08J 3/128; Y10T 428/2991
USPC ................................................. 428/402–403
See application file for complete search history.

(56) References Cited

U.S. PATENT DOCUMENTS

| | | | | |
|---|---|---|---|---|
| 5,846,607 | A | * | 12/1998 | Hurley ................ B05D 1/18 427/374.2 |
| 6,136,948 | A | * | 10/2000 | Dickens, Jr. ............... C08J 9/24 528/323 |
| 6,245,281 | B1 | | 6/2001 | Scholten et al. |
| 7,906,063 | B2 | | 3/2011 | Monsheimer et al. |
| 8,066,933 | B2 | | 11/2011 | Monsheimer et al. |
| 8,173,258 | B2 | | 5/2012 | Monsheimer et al. |
| 8,449,809 | B2 | | 5/2013 | Monsheimer et al. |
| 8,591,797 | B2 | | 11/2013 | Monsheimer et al. |
| 8,865,053 | B2 | | 10/2014 | Monsheimer et al. |
| 9,114,567 | B2 | | 8/2015 | Monsheimer et al. |
| 9,272,446 | B2 | | 3/2016 | Grebe et al. |
| 9,382,420 | B2 | | 7/2016 | Diekmann et al. |
| 9,428,610 | B2 | | 8/2016 | Diekmann et al. |
| 9,643,359 | B2 | | 5/2017 | Baumann et al. |
| 10,479,733 | B2 | | 11/2019 | Diekmann et al. |
| 10,968,314 | B2 | * | 4/2021 | Diekmann ............. B33Y 80/00 |
| 11,117,837 | B2 | * | 9/2021 | Diekmann ............. B29C 64/165 |
| 2002/0150726 | A1 | | 10/2002 | Nun et al. |
| 2004/0106691 | A1 | | 6/2004 | Monsheimer et al. |
| 2004/0180980 | A1 | * | 9/2004 | Petter .................... C08L 77/00 522/2 |
| 2006/0071359 | A1 | | 4/2006 | Monsheimer et al. |
| 2006/0202395 | A1 | * | 9/2006 | Monsheimer ............. C08J 3/12 264/497 |
| 2006/0223928 | A1 | | 10/2006 | Monsheimer et al. |
| 2006/0244169 | A1 | | 11/2006 | Monsheimer et al. |
| 2006/0246287 | A1 | * | 11/2006 | Gersch ................... C08J 3/14 428/402 |
| 2007/0183918 | A1 | | 8/2007 | Monsheimer et al. |
| 2007/0197692 | A1 | | 8/2007 | Monsheimer et al. |
| 2007/0238056 | A1 | | 10/2007 | Baumann et al. |
| 2008/0116616 | A1 | | 5/2008 | Monsheimer et al. |
| 2008/0166496 | A1 | | 7/2008 | Monsheimer et al. |

(Continued)

FOREIGN PATENT DOCUMENTS

| | | |
|---|---|---|
| DE | 197 47 309 A1 | 4/1999 |
| EP | 1 424 354 A1 | 6/2004 |

(Continued)

OTHER PUBLICATIONS

Shinto Fine Co., Ltd., "Development of Spherical Polyamide Fine Powder", R&D Report, "Sumitomo Kagaku", vol. 2006-I. (Year: 2006).*
Pappas et al., "Surface modification of polyamide fibers and films using atmospheric plasmas", Surface & Coatings Technology 201 (2006) 4384-4388 (Year: 2006).*
Conference paper: Studies in Properties of Different Waxes Using DSC and Correlating These With the Properties Obtained by Conventional Methods. (Year: 2018).*

(Continued)

*Primary Examiner* — Hoa (Holly) Le
(74) *Attorney, Agent, or Firm* — Grüneberg and Myers PLLC

(57) ABSTRACT

A polymer powder having a surface energy of less than 35 mN/m is suitable for melting/sintering powder particles for layer-by-layer production of three-dimensional objects.

15 Claims, No Drawings

(56) References Cited

U.S. PATENT DOCUMENTS

| | | |
|---|---|---|
| 2009/0236775 A1 | 9/2009 | Monsheimer et al. |
| 2011/0130515 A1 | 6/2011 | Monsheimer et al. |
| 2012/0041132 A1 | 2/2012 | Monsheimer et al. |
| 2012/0070666 A1 | 3/2012 | Gersch et al. |
| 2012/0315483 A1 | 12/2012 | Baumann et al. |
| 2013/0011660 A1 | 1/2013 | Diekmann et al. |
| 2013/0012643 A1 | 1/2013 | Monsheimer et al. |
| 2013/0171416 A1 | 7/2013 | Diekmann et al. |
| 2013/0181804 A1 | 7/2013 | Miyamura et al. |
| 2013/0183529 A1 | 7/2013 | Diekmann et al. |
| 2013/0216836 A1 | 8/2013 | Grebe et al. |
| 2013/0274435 A1 | 10/2013 | Diekmann et al. |
| 2013/0307196 A1 | 11/2013 | Corriol et al. |
| 2013/0316145 A1 | 11/2013 | Diekmann et al. |
| 2014/0087157 A1 | 3/2014 | Yoo et al. |
| 2014/0255666 A1 | 9/2014 | Stucker et al. |
| 2014/0371364 A1* | 12/2014 | Monsheimer ......... B29C 64/153 524/394 |
| 2015/0024316 A1* | 1/2015 | Orrock ................. B29C 64/153 430/108.3 |
| 2015/0251247 A1 | 9/2015 | Monsheimer et al. |
| 2015/0336292 A1* | 11/2015 | Mikulak ................... B29B 9/12 428/402 |
| 2015/0344682 A1* | 12/2015 | Ganapathiappan ..... C08L 33/00 264/401 |
| 2016/0167304 A1 | 6/2016 | Diekmann et al. |
| 2017/0165912 A1* | 6/2017 | Diekmann ............. C08G 69/08 |
| 2017/0165913 A1* | 6/2017 | Diekmann ............. C08J 3/128 |
| 2018/0105669 A1* | 4/2018 | Otsubo ..................... C08J 3/14 |
| 2020/0298473 A1* | 9/2020 | Shiraishi ................ C08L 71/12 |

FOREIGN PATENT DOCUMENTS

| | | |
|---|---|---|
| JP | H11-216779 | 8/1999 |
| JP | 2004-175102 | 6/2004 |
| JP | 2017-110218 | 6/2017 |
| WO | 2012/076528 | 6/2012 |

OTHER PUBLICATIONS

Surface Property Modification Via Wax Emulsions, Surface Phenomena and Fine Particles in Water•Based Coatings and Printing Technology Edited by M.K. Sharma and F.J. Micale, Plenum Press, New York, 1991 (Year: 1991).*

Studies in Properties of Different Waxes Using DSC and Correlating These With the Properties Obtained by Conventional Methods, International Journal of Research in Science & Engineering, CHEMCON Special Issue : Mar. 2018 (Year: 2018).*

Office Action mailed in JP 2016-242524 dated Nov. 6, 2017, with English language translation.

Search Report dated May 25, 2016 in European Patent application No. 15 19 9919 (with English translation of category of cited documents).

Gregory T. Dee, et al., "The Molecular Weight and Temperature Dependence of Polymer Surface Tension: Comparison of Experiment with Interface Gradient Theory," Journal of Colloid and Interface Science, vol. 152, No. 1, Aug. 1992, XP024206148, pp. 85-103.

D.K. Owens, et al., "Estimation of the Surface Free Energy of Polymers," Journal of Applied Polymer Science, vol. 13, 1969, pp. 1741-1747.

James T. Rimell, et al., "Selective Laser Sintering of Ultra High Molecular Weight Polyethylene for Clinical Applications," Journal of Biomedical Materials Research, Bd.53, No. 4, Jan. 2000, XP055274789, pp. 414-420.

U.S. Appl. No. 15/379,260, filed Dec. 14, 2016, 2017/0165913, Diekmann et al.

U.S. Appl. No. 11/332,270, filed Jan. 17, 2006, 2006/0244169, Monsheimer et al.

U.S. Pat. No. 7,906,063, Mar. 15, 2011, 2007/0197692, Monsheimer et al.

U.S. Appl. No. 13/024,629, filed Feb. 10, 2011, 2011/0130515, Monsheimer et al.

U.S. Pat. No. 9,114,567, Aug. 25, 2015, 2007/0183918, Monsheimer et al.

U.S. Appl. No. 14/717,122, filed May 20, 2015, 2015/0251247, Monsheimer et al.

U.S. Pat. No. 8,066,933, Nov. 29, 2011, 2008/0116616, Monsheimer et al.

U.S. Pat. No. 8,449,809, May 28, 2013, 2012/0041132, Monsheimer et al.

U.S. Pat. No. 9,643,359, May 9, 2017, 2007/0238056, Monsheimer et al.

U.S. Pat. No. 8,865,053, Oct. 21, 2014, 2008/0166496, Monsheimer et al.

U.S. Pat. No. 8,173,258, May 8, 2012, 2006/0071359, Monsheimer et al.

U.S. Pat. No. 8,591,797, Nov. 26, 2013, 2009/0236775, Monsheimer et al.

U.S. Appl. No. 13/541,181, filed Jul. 3, 2012, 2013/0012643, Monsheimer et al.

U.S. Appl. No. 13/581,085, filed Aug. 24, 2012, 2012/0315483, Baumann et al.

U.S. Pat. No. 10,479,733, Nov. 19, 2019, 2013/0011660, Diekmann et al.

U.S. Pat. No. 9,382,420, Jul. 5, 2016, 2013/0183529, Diekmann et al.

U.S. Pat. No. 9,428,610, Aug. 30, 2016, 2013/0171416, Diekmann et al.

U.S. Pat. No. 9,272,446, Mar. 1, 2016, 2013/0216836, Grebe et al.

U.S. Appl. No. 13/859,896, filed Apr. 10, 2013, 2013/0274435, Diekmann et al.

U.S. Appl. No. 13/889,568, filed May 8, 2013, 2013/0316145, Diekmann et al.

U.S. Appl. No. 15/051,757, filed Feb. 24, 2016, 2016/0167304, Diekmann et al.

* cited by examiner

POLYMER POWDER HAVING LOW SURFACE ENERGY FOR POWDER BED FUSION METHODS

CROSS-REFERENCE TO RELATED APPLICATIONS

This application is a continuation application of U.S. Ser. No. 15/379,260 filed on Dec. 14, 2016, the entirety of which is incorporated by reference, and which claims the benefit of priority to European Application No. 15199919, filed on Dec. 14, 2015, the entirety of which is incorporated by reference.

BACKGROUND OF THE INVENTION

Field of the Invention

The present invention relates to a polymer powder for use in a powder bed fusion method.

Description of the Related Art

The rapid provision of prototypes or small batches is a problem that has frequently been encountered in recent times. Methods that enable this are called rapid prototyping, rapid manufacturing, additive fabrication methods or 3D printing. Particularly suitable methods are those in which the desired structures are produced layer by layer, by selective melting and/or consolidation of pulverulent materials. The methods that work according to this principle are referred to collectively by the umbrella term powder bed fusion.

One example of powder bed fusion methods is laser sintering, which is described in detail in patent specifications U.S. Pat. No. 6,136,948 and WO 9606881. Further examples of powder bed fusion methods are described in patent specifications U.S. Pat. No. 6,531,086 and EP1740367. DE 19747309 discloses a powder of good suitability for use in the powder bed fusion method.

Powder bed fusion methodology includes, among other techniques, direct metal laser sintering (DMLS), electron beam melting (EBM), selective heat sintering (SHS), selective laser melting (SLM), selective laser sintering (SLS), selective absorbing sintering (SAS) and selective inhibition sintering (SIS).

The aim in all methods is that the components produced by means of the process as far as possible have the same density as the polymeric material from which the powder has been produced. Cavities and/or inclusions are correspondingly undesirable. Good coalescence of the partly or fully molten powder particles is accordingly necessary. In order to avoid surface defects in components, even a powder used several times in a powder bed fusion method is required to have good coalescence of the partly or fully molten powder particles. A simple reduction in the viscosity of the polymeric material, in order to improve the coalescence of the polymer particles, is not appropriate to the aim, since the dimensional stability of the melt suffers at low viscosity. This effect does not lead to components that are true to scale and is therefore undesirable.

SUMMARY OF THE INVENTION

It is an object of the present invention to provide a powder composed of a polymeric material, which allows good coalescence of the molten powder particles, but the melt of which simultaneously has sufficiently high dimensional stability, which allows the production of components that are true to scale.

The object is surprisingly achieved by means of a powder having a free surface energy of less than 35 mN/m. Preferably, the powder has a free surface energy of less than 32 mN/m, more preferably of less than 30 mN/m. The free surface energy is determined here by means of a contact angle method by the capillary rise height method using the Washburn equation and the evaluation method according to Owens, Wendt, Rabel and Kaelble. The contact angle measurements are conducted with the Krüss Tensiometer K12 processor under standard climatic conditions (23° C., 50% air humidity) and evaluated with the installed K121.2b software. In preparation for the contact angle measurement, the powder is pre-compacted by means of a tamping volumeter (STAV 2003/from J. Engelsmann) with 1000 strokes. The contact angle measurement is conducted in each case in the solvents diiodomethane, ethylene glycol and an 80/20 mixture of water and ethanol.

It has been found that, surprisingly, the coating of the powder particles with hydrophobic substances can improve the coalescence of the molten powder particles, and the layer simultaneously has sufficiently high dimensional stability. In this respect, polymer powders coated with hydrophobic substances are preferred polymer powders of this invention.

DETAILED DESCRIPTION OF THE INVENTION

Surfaces having a contact angle of more than 90° with respect to water are referred to as hydrophobic. Hydrophobic surfaces generally consist of or are covered by hydrophobic substances. The contact angle is to be measured with the Krüss DSA100S (automated measurement according to manufacturer's instructions). Preferably, the hydrophobic substances have a contact angle of more than 120° with respect to water.

The process temperature is set up to about 10° C. below the melting point of the polymer powder in the processing of semicrystalline polymers, in order to minimize the warpage of the objects to be produced. Moreover, the curl effect, which disrupts the construction process, should be avoided. However, the process temperature shall not have caused the polymer particles to sinter or even melt, since this would complicate the deinstallation of the objects produced from the powder cake. The powder application would also be made difficult by partly molten particles.

Typically, additives that are still solid at the process temperature are added to the powders that are used in the powder bed fusion methods. It has been found that, surprisingly, it is possible to coat the polymer particles with hydrophobic substances having a melting point well below the process temperature. In other words, the hydrophobic substances are in liquid form at the typical process temperatures. The melting point of the hydrophobic substances at standard pressure (1013 hPa) is preferably below 160° C. (DIN 53765, DSC 7 from Perkin Elmer, heating rate 20 K/min). Preferably, the melting point of the hydrophobic substances is below 120° C. and more preferably below 90° C. However, the boiling point of the hydrophobic substances should be well above the process temperature. Preferably, the hydrophobic substances have a boiling point at standard pressure of more than 190° C. (DIN 53765, DSC 7 from Perkin Elmer, heating rate 20 K/min). Most preferably, the hydrophobic substances have a boiling point at standard pressure of more than 300° C.

Examples of suitable hydrophobic substances are selected from the group consisting of saturated or unsaturated fatty alcohols, saturated and unsaturated fats, waxes, lactams, alkenes, alkanes and mixtures thereof, preferably alkanes and alkenes, preference being given to alkanes and mixtures with alkanes containing at least 50% by weight, preferably 70% by weight and more preferably 90% by weight of alkanes, based on the total weight of hydrophobic substances. Particularly preferred fatty alcohols have twelve to 30 carbon atoms. Particularly preferred fats are triglycerides with saturated or unsaturated fatty acids composed of twelve to 30 carbon atoms. Examples of waxes are esters of wax acids with the aforementioned fatty alcohols. Particularly preferred lactams have six to 15 carbon atoms. Particularly preferred alkenes have twelve to 40 carbon atoms. Particularly preferred alkanes have eleven to 40 carbon atoms.

In this respect, polymer powders of the invention that are obtainable via the coating with the hydrophobic substances are a particularly preferred embodiment of the invention.

The amount of hydrophobic substance with which the polymer powder is coated is between 0.15% and 20% by weight, based on the total weight of polymer powder and the hydrophobic substance. The proportion is preferably between 3% and 15% by weight, more preferably between 5% and 12% by weight. The polymer powder is preferably coated at temperatures of not more than 100° C., more preferably at not more than 80° C. (at standard pressure).

As well as the good coalescence of the particles and the dimensional stability of the melt, the homogeneity of the melt is advantageous for powder bed fusion methods. The homogeneity of the melt depends on the form of the powder bed of the particles to be melted. The form of the powder bed can be positively influenced via the choice of particle shape. A powder bed which is optimal for powder bed fusion methods can be achieved by means of particles having a sphericity of at least 0.5. Preferably, the sphericity of the particles is at least 0.7. More preferably, the sphericity of the particles is at least 0.9. The Wadell sphericity is measured according to ISO 13322-1:2014 with QICPIC/R high-performance image analysis from Sympatec, measured at 500 image/s with 2336×1728 square pixels and exposure time 1 ns and 1 million particles evaluated; 50 g are dry-dispersed by means of a RODOS/L dry disperser and VIBRI/L precision oscillating channel.

In principle, all known polymer powders are suitable for use in powder bed fusion methods. If the components produced are to have the same density as far as possible as the polymeric material, however, semicrystalline polymers are advantageous, it being particularly advantageous when the polymer powder comprises at least one polyamide (PA) or a copolyamide. Preferably, the polymers are selected from polyamides and copolyamides. Particularly suitable are PA11, PA12, PA613 and PA106. Very particularly suitable is PA12.

Preferred polymers have an etarel value of 1.55 to 2. The etarel value is measured according to ISO 307 (Schott AVS Pro, solvent m-cresol in acidic form, volumetric method, double determination, dissolution temperature 100° C., dissolution time 2 h, polymer concentration 5 g/l, measurement temperature 25° C.).

It is additionally preferable when the polymer powders have a particle size $d_{50}$ of 40 μm to 95 μm, more preferably 40 μm to 70 μm. The particle size $d_{50}$, and also the values $d_{10}$ and $d_{90}$ reported in the examples, are determined by laser diffraction (Malvern Mastersizer 2000, dry measurement, 20-40 g of powder are metered in by means of a Scirocco dry disperser, vibrating channel feed rate 70%, dispersion air pressure 3 bar; the residence time of the sample is 5 seconds (5000 individual measurements), refractive index and blue light value is fixed at 1.52; evaluation via Mie theory).

The invention further provides a method for producing a polymer powder of the invention. For this purpose, the polymer powder is coated with a hydrophobic substance. The polymer powders can be coated with hydrophobic substances by dissolving the hydrophobic substances in a suitable solvent such as alcohols having at least four carbon atoms (such as 1-butanol or 1-hexanal), petroleum spirit according to DIN 51632-1 or 51632-2 or turpentine oil (CAS 8006-64-2), and then mixing with the powder to be coated. The solvent can then be drawn off and the hydrophobic substances remain in homogeneous distribution on the powder particles. Alternatively, the hydrophobic substance can be sprayed onto the polymer powder. Furthermore, the coated polymer powder can be obtained by means of hot mixing. For this purpose, the powder and solid hydrophobic substance are mixed with one another and heated to above the melting point of the hydrophobic substance. As a further alternative the application of the hydrophobic substance can be made by means of one or more nozzles.

If the powder is produced by the method described in DE 29 06 647, the hydrophobic substances can be added prior to the precipitation in the solution or preferably after the precipitation phase of the suspension.

The invention further provides a powder bed fusion method in which a polymer powder of the invention is used. A preferred powder bed fusion method is selected from selective laser sintering, selective absorbing sintering and selective inhibition sintering.

The invention further provides shaped bodies which are obtained from the powder bed fusion method.

Having generally described this invention, a further understanding can be obtained by reference to certain specific examples which are provided herein for purposes of illustration only, and are not intended to be limiting unless otherwise specified.

EXAMPLES

Example 1: Polyamide 12 Powder PA2200 (Non-Inventive)

The PA2200 is a powder from EOS GmbH for use in selective laser sintering. The etarel value is 1.60.

Example 2: Polyamide 11 Duraform EX (Non-Inventive)

The Duraform EX is a powder from 3D-systems for use in selective laser sintering; etarel value is 1.85.

Example 3: Polyamide 613 Precipitation Powder (PA 613) (Non-Inventive)

A pelletized polyamide 613 material having an etarel value of 1.65 was precipitated in ethanol by means of a precipitation method as described in DE 10 2004 020 453, followed by sieving through a 200 μm guard sieve. Table 1 lists the resulting powder properties.

Example 4: Polyamide 106 Precipitation Powder (PA 106) (Non-Inventive)

A pelletized polyamide 106 material having an etarel value of 1.81 was precipitated in ethanol by means of a precipitation method as described in DE 29 06 647, followed by sieving through a 200 μm guard sieve. Table 1 lists the resulting powder properties.

Example 5: Polyamide 12 Powder (Inventive)

10 kg of the powder from Example 1 were coated with an alkane. For this purpose, 500 g of tetracosane were dissolved in 1500 g of 1-butanol and mixed with the powder in a Mixaco CM50 D mixer at 150 rpm for one minute. Thereafter, the 1-butanol was drawn off by drying and the remaining powder was sieved through a 200 μm guard sieve. Table 1 lists the resulting powder properties.

Example 6: Polyamide 11 Powder (Inventive)

10 kg of the powder from Example 2 were coated with an alkane mixture (H&R WAX 58/60 DAB). For this purpose, 100 g of alkane mixture were dissolved in 750 g of 1-hexanol and mixed with the powder in a Mixaco CM50 D mixer at 150 rpm for one minute. Thereafter, the 1-hexanol was drawn off by drying and the remaining powder was sieved through a 200 μm guard sieve. Table 1 lists the resulting powder properties.

Example 7: Polyamide 613 Powder (Inventive)

The pelletized 613 material from Example 3 was precipitated in ethanol by means of a precipitation method as described in DE 10 2004 020 453 and then the suspension was admixed with 10 parts tetracosane (25% solution in 1-butanol) based on the mass of powder. The suspension was dried and then sieved through a 200 μm guard sieve. Table 1 lists the resulting powder properties.

Example 8: Polyamide 106 Powder (Inventive)

The pelletized 106 material from Example 4 was precipitated in ethanol by means of a precipitation method as described, for example, in DE 29 06 647 and then the suspension was admixed with 14 parts hexatriacontane (25% solution in 1-butanol) based on the mass of powder. The suspension was dried and then sieved through a 200 μm guard sieve. Table 1 lists the resulting powder properties.

Example 9: Polyamide 12 Powder (Inventive)

10 kg of the powder from Example 1 were coated with a fatty alcohol. For this purpose, 600 g of 1-hexadecanol weare dissolved in 1500 g of 1-butanol and mixed with the powder in a Mixaco CM50 D mixer at 150 rpm for one minute. Thereafter, the 1-butanol was drawn off by drying and the remaining powder was sieved through a 200 μm guard sieve. Table 1 lists the resulting powder properties.

Example 10: Polyamide 12 Powder (Inventive)

10 kg of the powder from Example 1 were coated with a fat. For this purpose, 200 g of triolein were dissolved in 1500 g of 1-butanol and mixed with the powder in a Mixaco CM50 D mixer at 150 rpm for one minute. Thereafter, the 1-butanol was drawn off by drying and the remaining powder was sieved through a 200 μm guard sieve. Table 1 lists the resulting powder properties.

Table 1 lists the indices of the powders from the examples. It is apparent that the surface energy has been reduced by the addition of the hydrophobic substances. The particle distribution is virtually unchanged as a result of the addition of the alkanes.

TABLE 1

Particle sizes and surface energies of the polymer powders

| | Polyamide | Surface energy [mN/m] | Particle size $d_{90}$ [μm] | Particle size $d_{50}$ [μm] | Particle size $d_{10}$ [μm] |
|---|---|---|---|---|---|
| Ex. 1* | 12 | 38 | 82 | 58 | 39 |
| Ex. 2* | 11 | 37 | 77 | 47 | 19 |
| Ex. 3 | 613 | 39 | 132 | 89 | 50 |
| Ex. 4* | 106 | 39 | 90 | 63 | 44 |
| Ex. 5 | 12 | 28 | 80 | 58 | 37 |
| Ex. 6 | 11 | 30 | 77 | 48 | 22 |
| Ex. 7 | 613 | 32 | 130 | 88 | 50 |
| Ex. 8 | 106 | 33 | 91 | 62 | 45 |
| Ex. 9 | 12 | 29 | 79 | 57 | 37 |
| Ex. 10 | 12 | 31 | 80 | 58 | 38 |

*non-inventive

The powders of the examples were each processed in accordance with the description which follows in an EOSINT P380. The construction chamber was preheated to a temperature 20° C. below the DSC melting point (DIN 53765, DSC 7 from Perkin Elmer, heating rate 20 K/min) of the polymer for 180 minutes. Thereafter, the temperature in the construction chamber was increased to 10° C. below the DSC melting point of the polymer. Prior to the first exposure, 40 layers were applied without exposure.

The component to be exposed was positioned centrally in the construction field. A square area having an edge length of 50 mm was melted by means of the laser. The energy input of the laser was 60 mJ/mm² (laser power 21 W, scan speed 1170 mm/s, spacing of exposure lines 0.3 mm). Thereafter, the construction platform was lowered by 0.15 mm and a new powder layer was applied at a speed of 100 mm/s by means of a coater. These steps were repeated until a three-dimensional component of height 50 mm has formed. After conclusion of the exposure, 40 further layers were applied before the heating elements of the device were switched off and the cooling phase was initiated. The time taken for each layer during the overall construction process was below 40 s.

After cooling time of at least 12 hours, the component was removed and freed of the adhering powder. The dimensions of the component were determined, the mass of the component was weighed, and these were used to calculate the density. Table 2 lists the component densities of the examples. It is apparent that the components which have been produced from the powders of the invention have a higher density than the comparable powders that are not according to the invention. The powders of the invention thus achieved better coalescence of the melt.

TABLE 2

Density of the components obtained

| Component | Polyamide | Density PA [g/cm³] | Component density [g/cm³] |
|---|---|---|---|
| Example 1 | 12 | 1.01 | 0.93 |
| Example 2 | 11 | 1.03 | 0.98 |
| Example 3 | 613 | 1.03 | 0.99 |
| Example 4 | 106 | 1.06 | 0.99 |
| Example 5 | 12 | 1.01 | 0.97 |
| Example 6 | 11 | 1.03 | 1.01 |

TABLE 2-continued

Density of the components obtained

| Component | Polyamide | Density PA [g/cm³] | Component density [g/cm³] |
|---|---|---|---|
| Example 7 | 613 | 1.03 | 1.02 |
| Example 8 | 106 | 1.06 | 1.02 |
| Example 9 | 12 | 1.01 | 0.96 |
| Example 10 | 12 | 1.01 | 0.95 |

European patent application EP 151 999 19 filed Dec. 14, 2015, is incorporated herein by reference.

The invention claimed is:

1. A polymer powder having a particle size $d_{50}$ of 40 to 95 µm, a surface energy of less than 35 mN/m and which has been coated with at least one hydrophobic substance which is a lactam having six to 15 carbon atoms.

2. The polymer powder according to claim 1, having a surface energy of less than 32 mN/m.

3. The polymer powder according to claim 1, having a surface energy of less than 30 mN/m.

4. The polymer powder according to claim 1, wherein surface energy is determined by a contact angle method.

5. The polymer powder according to claim 1, wherein the proportion of the hydrophobic substance accounts for 0.15% to 20% by weight, based on the total weight of polymer powder and the hydrophobic substance.

6. The polymer powder according to claim 1, wherein the hydrophobic substance accounts for 3-15% by weight, based on the total weight of polymer powder and the hydrophobic substance.

7. The polymer powder according to claim 1, wherein the hydrophobic substance accounts for 5-12% by weight, based on the total weight of polymer powder and the hydrophobic substance.

8. The polymer powder according to claim 1, wherein the hydrophobic substance has a melting point of not more than 160° C. and a boiling point of at least 190° C.

9. The polymer powder according to claim 1, wherein the hydrophobic substance has a melting point of below 120° C.

10. The polymer powder according to claim 1, wherein the hydrophobic substance has a melting point of below 90° C.

11. The polymer powder according to claim 1, wherein the hydrophobic substance has a boiling point of more than 300° C.

12. The polymer powder according to claim 1, wherein the polymer of the polymer powder is selected from the group consisting of polyamide, copolyamide and mixtures thereof.

13. The polymer powder according to claim 1, wherein a Wadell sphericity is at least 0.5.

14. The polymer powder according to claim 1, wherein said polymer powder has a particle size $d_{50}$ of 40-70 µm.

15. The polymer powder according to claim 1, which is suitable for use in a powder bed fusion method.

* * * * *